United States Patent
Matsuo et al.

(10) Patent No.: US 11,213,916 B2
(45) Date of Patent: Jan. 4, 2022

(54) LASER MACHINING METHOD

(71) Applicant: NSK LTD., Tokyo (JP)

(72) Inventors: Shingo Matsuo, Fujisawa (JP); Hiroaki Fujishiro, Fujisawa (JP); Etsuo Koike, Fujisawa (JP); Hironori Okado, Fujisawa (JP)

(73) Assignee: NSK LTD., Tokyo (JP)

( * ) Notice: Subject to any disclaimer, the term of this patent is extended or adjusted under 35 U.S.C. 154(b) by 476 days.

(21) Appl. No.: 15/999,780

(22) PCT Filed: Dec. 21, 2017

(86) PCT No.: PCT/JP2017/045914
§ 371 (c)(1),
(2) Date: Aug. 20, 2018

(87) PCT Pub. No.: WO2018/179632
PCT Pub. Date: Oct. 4, 2018

(65) Prior Publication Data
US 2019/0366478 A1    Dec. 5, 2019

(30) Foreign Application Priority Data
Mar. 31, 2017   (JP) .............................. JP2017-071614

(51) Int. Cl.
*B23K 26/211* (2014.01)
*B23K 26/064* (2014.01)
(Continued)

(52) U.S. Cl.
CPC .......... *B23K 26/211* (2015.10); *B23K 26/064* (2015.10); *B23K 26/08* (2013.01); *B23K 26/14* (2013.01); *F16C 33/46* (2013.01)

(58) Field of Classification Search
CPC .... B23K 26/211; B23K 26/064; B23K 26/08; B23K 26/14; B23K 26/32; B23K 26/342;
(Continued)

(56) References Cited

U.S. PATENT DOCUMENTS 4,664,587 A  *  5/1987  Case, Jr. ................ B23K 9/287
                                                 219/124.1
4,757,180 A  *  7/1988  Kainz ................... B23K 9/1336
                                                 219/137.2
(Continued)

FOREIGN PATENT DOCUMENTS

CN         105618930 A    6/2016
ER          2965878 A1    1/2016
(Continued)

OTHER PUBLICATIONS

JP 09108869 A translation (Year: 1997).*
(Continued)

*Primary Examiner* — Ibrahime A Abraham
*Assistant Examiner* — Chris Q Liu
(74) *Attorney, Agent, or Firm* — Sughrue Mion, PLLC

(57) ABSTRACT

A laser welding apparatus (1) includes a laser welding head (5) configured to irradiate a workpiece (10) with laser light, a welding filler feeding mechanism (6) configured to supply a welding material to a position on which laser welding is performed, and a hollow structural moving mechanism (100) configured to move a welding unit (50) including the laser welding head and the welding filler feeding mechanism. The hollow structural moving mechanism has an insertion portion (3a) through which wire materials (41 and 62) of the laser welding head and the welding filler feeding mechanism are inserted.

8 Claims, 7 Drawing Sheets

(51) Int. Cl.
  *B23K 26/08* (2014.01)
  *B23K 26/14* (2014.01)
  *F16C 33/46* (2006.01)

(58) Field of Classification Search
  CPC ............... B23K 26/0884; B23K 26/34; B23K 26/1423; B23K 26/032; B23K 26/04; B23K 26/147; B23K 26/242; B23K 26/26; B23K 26/28; B23K 26/044; B23K 26/1476; B23K 26/282; B23K 26/702; B23K 26/037; B23K 26/0608; F16C 33/46
  USPC ............ 219/121.64, 121.63, 121.83, 121.66, 219/121.14, 121.72, 121.76, 121.79, 219/121.13, 121.69, 121.81, 121.85, 219/137.44, 137.63, 61
  See application file for complete search history.

(56) References Cited

U.S. PATENT DOCUMENTS

| | | | | |
|---|---|---|---|---|
| 5,140,129 | A | * | 8/1992 | Torii ................... B23K 26/0884 219/121.78 |
| 2004/0261562 | A1 | * | 12/2004 | Haniya ................ B25J 17/0283 74/490.02 |
| 2016/0101526 | A1 | * | 4/2016 | Saito ..................... H02K 11/215 74/490.06 |
| 2016/0375580 | A1 | * | 12/2016 | Kinoshita ............. B25J 9/1628 700/253 |
| 2017/0191527 | A1 | * | 7/2017 | Krebs ................. F16C 33/3887 |

FOREIGN PATENT DOCUMENTS

| | | |
|---|---|---|
| JP | 63-33187 A | 2/1988 |
| JP | 3-027886 A | 2/1991 |
| JP | 07164171 A | 6/1995 |
| JP | 09-108869 A | 4/1997 |
| JP | 10-26692 A | 1/1998 |
| JP | 2000-317666 A | 11/2000 |
| JP | 2000-317667 A | 11/2000 |
| JP | 2003-88987 A | 3/2003 |
| JP | 2003-336644 A | 11/2003 |
| JP | 2012024777 A | 2/2012 |
| JP | 2013-215781 A | 10/2013 |
| JP | 2015-226925 A | 12/2015 |
| JP | 2016-118300 A | 6/2016 |
| JP | 2017-001068 A | 1/2017 |
| KR | 10-2005-0103378 A | 10/2005 |

OTHER PUBLICATIONS

Communication dated Sep. 17, 2020, issued by the State Intellectual Property Office of the P.R.C. in application No. 201780088533.1.
Search Report dated Jan. 27, 2020 from the European Patent Office in application No. 17904109.0.
International Search Report for PCT/JP2017/045914 dated Mar. 13, 2018 [PCT/ISA/210].
Office Action dated Oct. 19, 2021 in Japanese Application No. 2018-115672 English Translation.

* cited by examiner (a)

(b)

[ PRIOR ART ]

LASER MACHINING METHOD

CROSS REFERENCE TO RELATED APPLICATIONS

This application is a National Stage of International Application No. PCT/JP2017/045914 filed Dec. 21, 2017, claiming priority based on Japanese Patent Application No. 2017-071614 filed Mar. 31, 2017, the content of which is incorporated herein by reference.

TECHNICAL FIELD

The present invention relates to a laser welding apparatus, a laser machining apparatus, a laser welding method, a method for manufacturing a bearing, a method for manufacturing a machine, a method for manufacturing a vehicle, a bearing, a machine, and a vehicle, and particularly, to a technique for performing a laser processing of an arbitrary shape such as an annular shape or an S shape on an object main body to be machined.

TECHNICAL BACKGROUND

For example, Patent Document 1 describes an apparatus configured to perform laser welding on a tubular (cylindrical) workpiece when a laser moves only in a Z direction (vertical direction) by rotating a workpiece. Patent Document 2 describes an apparatus configured to perform laser welding on a tubular (cylindrical) workpiece when a laser moves only in an X direction (a horizontal direction which is perpendicular to a vertical direction) by rotating a work.

RELATED ART DOCUMENTS

Patent Document

Patent Document 1
  Japanese Patent Application, Publication No. 2017-001068
Patent Document 2
  Japanese Patent Application, Publication No. 2015-226925

SUMMARY OF INVENTION

Technical Problem

An object of an aspect of the present invention is to provide a laser welding apparatus, a laser machining apparatus, a laser welding method, a method for manufacturing a bearing, a method for manufacturing a machine, and a method for manufacturing a vehicle which are appropriate for miniaturization of an apparatus, are appropriate for a relatively large workpiece, and/or are advantageous for handing an optical cable and a material. Another object of an aspect of the present invention is to provide a laser welding apparatus, a laser machining apparatus, a laser welding method, a method for manufacturing a bearing, a method for manufacturing a machine, and a method for manufacturing a vehicle which can manufacture a high quality product. Yet another object of an aspect of the present invention is to provide a high-quality bearing, machine, and a vehicle.

Solution to Problem

A laser machining apparatus according to a first aspect of the present invention includes: a head having an optical outlet from which laser light is output; an optical cable attached to the head; a nozzle attached to the head to direct a material supplied to a target; a moving mechanism having a driving portion; and a controller, wherein the moving mechanism includes a first mechanism to allow the head to move in a curved manner in at least a two-dimensional plane and a second mechanism, which has a rotational axis, to allow the head to rotate 360° or more around the rotational axis along with the optical cable and the material, and the controller has an attitude control mode in which the moving mechanism is controlled so that the head rotates around the rotational axis while the head moves in the curved manner in at least the two-dimensional plane.

A second aspect of the present invention is a laser welding apparatus which performs laser welding on a workpiece including: a laser welding head configured to irradiate the workpiece with laser light; a welding filler feeding mechanism configured to supply a welding material to a position on which the laser welding is performed; and a hollow structural moving mechanism configured to move a welding unit including the laser welding head and the welding filler feeding mechanism, the hollow structural moving mechanism having an insertion portion through which wire materials of the laser welding head and the welding filler feeding mechanism are inserted.

A third aspect of the present invention is a laser welding method using the laser welding apparatus in which the hollow structural moving mechanism and a two-dimensional actuator are synchronously driven so that an irradiation direction of laser light of the laser welding head and a feeding direction of a welding filler of the welding filler feeding mechanism are upheld in a predetermined manner with respect to a traveling direction of the laser welding head.

A fourth aspect of the present invention is a laser welding method using the laser welding apparatus in which the hollow structural moving mechanism and a three-dimensional actuator are synchronously driven so that an irradiation direction of laser light of the laser welding head and a feeding direction of a welding filler of the welding filler feeding mechanism are upheld in a predetermined manner with respect to a traveling direction of the laser welding head.

A bearing according to a fifth aspect of the present invention has an inner ring, an outer ring, a roller, a pin, a cage ring and a welded portion in which the pin and the cage ring are welded, and the welded portion is provided only around the pin.

A bearing according to a sixth aspect of the present invention is manufactured using the above-described laser machining apparatus or the above-described laser welding apparatus.

A machine according to a seventh aspect of the present invention includes: the above-described bearing.

A vehicle according to an eighth aspect of the present invention includes the above-described bearing.

A method for manufacturing a bearing according to a ninth aspect of the present invention includes using the above-described laser machining apparatus or the above-described laser welding apparatus.

A method for manufacturing a machine according to a tenth aspect of the present invention includes using the above-described laser machining apparatus or the above-described laser welding apparatus.

A method for manufacturing a vehicle according to an eleventh aspect of the present invention includes using the above-described laser machining apparatus or the above-described laser welding apparatus.

Advantageous Effects of Invention

According to an aspect of the present invention, it is possible to provide a laser welding apparatus, a laser machining apparatus, a laser welding method, a method for manufacturing a bearing, a method for manufacturing a machine, and a method for manufacturing a vehicle which are appropriate for miniaturization of an apparatus, are appropriate for a relatively large workpiece, and/or are advantageous for handing an optical cable and a material. Furthermore, according to an aspect of the present invention, it is possible to provide a laser welding apparatus, a laser machining apparatus, a laser welding method, a method for manufacturing a bearing, a method for manufacturing a machine, and a method for manufacturing a vehicle which can manufacture a high quality product. According to an aspect of the present invention, it is possible to provide a high-quality bearing, machine, and vehicle.

DESCRIPTION OF EMBODIMENTS

An embodiment of a laser machining apparatus (laser welding apparatus) according to the present invention will be described below on the basis of the drawings. Note that the present invention is not to be interpreted to be limited to this embodiment and the design thereof can be appropriately modified within the scope of the present invention.

In this specification, the laser machining apparatus is an apparatus configured to perform a predetermined processing on a target using laser light and a processing material. In an example, the laser machining apparatus is a laser welding apparatus configured to supply a filler as a material (wire material, welding material, or filler material) and energy of laser light and to perform a welding processing on a machining position on a target. In the laser welding apparatus, a workpiece is irradiated with laser light as an energy source from an optical outlet of a laser head. Part of the workpiece and/or the filler is melted and then the melted material solidifies. The laser welding apparatus can include a hybrid type welding apparatus for laser welding and other welding, for example, a laser/arc hybrid welding apparatus obtained by combining laser welding and arc welding. In another example, the laser machining apparatus can be applied to an apparatus configured to perform processes other than a welding processing using laser light and a material such as a three-dimensional printing system.

Figure 1A:
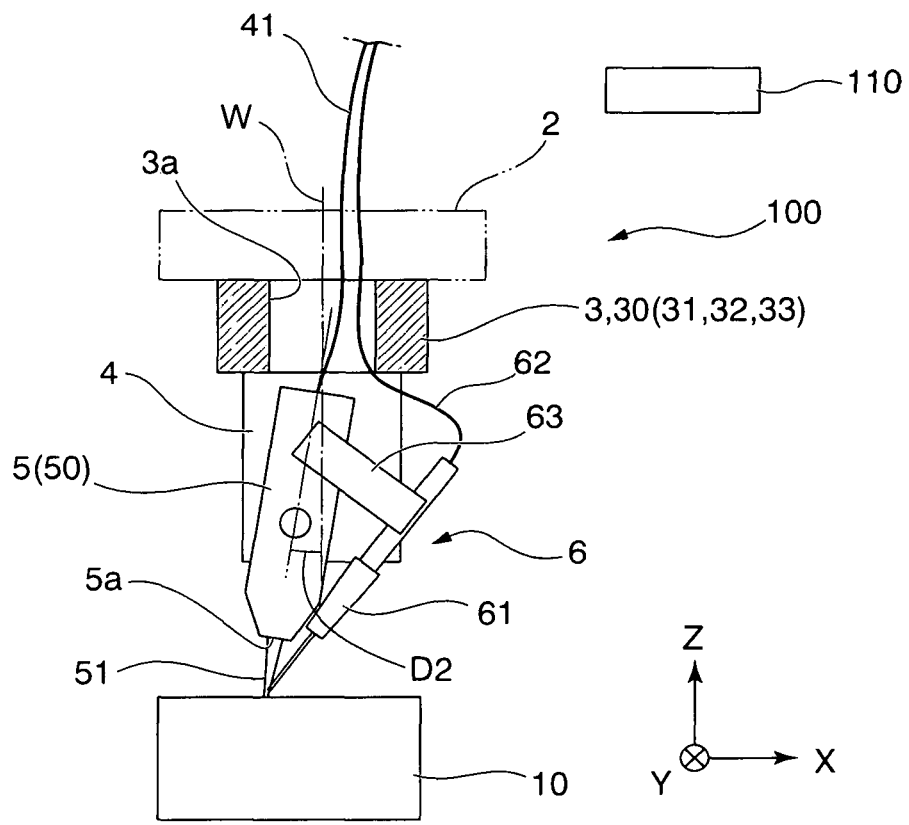
FIG. 1A is a schematic diagram showing a laser machining apparatus (laser welding apparatus) according to an embodiment of the present invention.

In one embodiment, as illustrated in FIG. 1A, a laser welding apparatus (laser machining apparatus) 1 includes a laser welding head (laser head or head) 5 configured to irradiate a workpiece 10 with laser light (laser beam) 51 and a welding filler feeding mechanism (feeder) 6 configured to supply a welding material to a position at which laser welding is performed. The head 5 includes an optical outlet (outlet surface or distal end element) 5a through which the laser light 51 is output. At least part of the welding filler feeding mechanism 6 is attached to the laser welding head 5. In an example, the head 5 has an optical cable (laser transmission optical fiber cable) 41 and a nozzle (material guide) 61 attached thereto. The nozzle 61 directs a processing material (filler material) 62 supplied to the target (workpiece) 10. The filler 62 is fed through a feeder function of the welding filler feeding mechanism 6 and the filler 62 is pushed out from the distal end (nozzle opening) of the nozzle 61. The nozzle 61 is fixed to the head 5 using a bracket (attachment plate) 63. The head 5 can be moved using a moving mechanism (hollow structural moving mechanism) 100 which will be described later. The nozzle 61 supported by the head 5 can be moved together with the head 5. The head 5 and the nozzle 61 move integrally with each other, and accordingly the optical cable 41 and the material (filler material) 62 move. For example, the material 62 can include a wire material and a material other than a wire material (powder material, fluid material, or the like).

Figure 8:
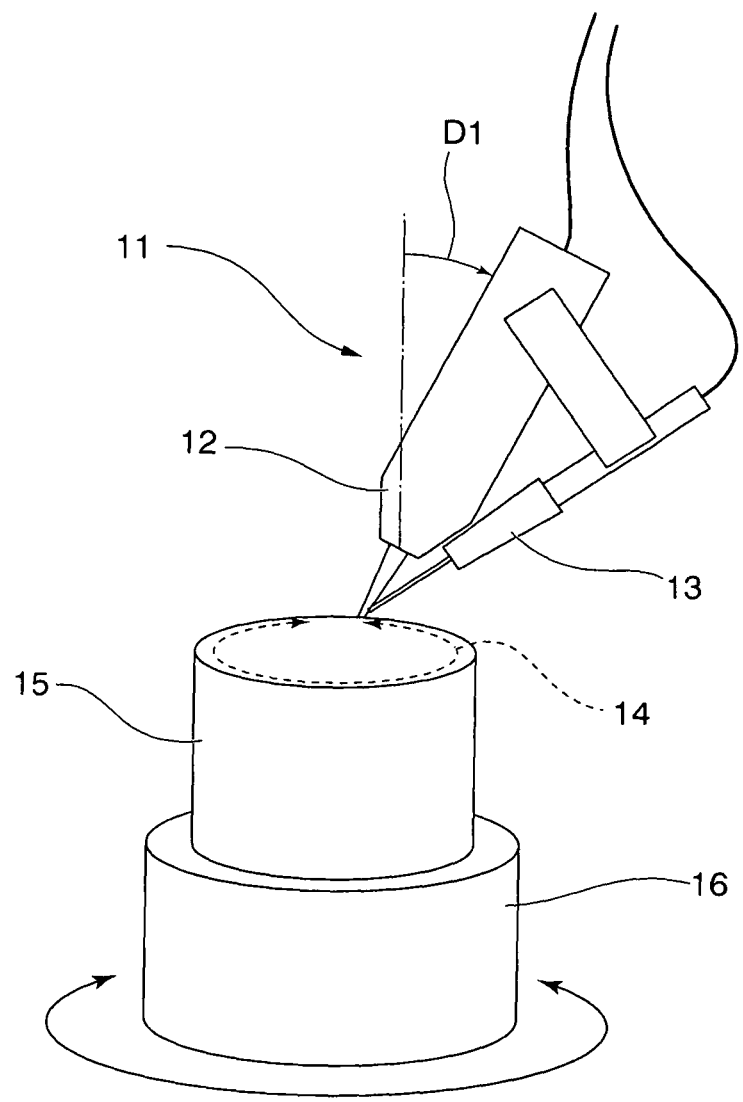
FIG. 8 is a schematic diagram showing a conventional laser welding apparatus.

In the related art, as illustrated in FIG. 8, in order to perform laser welding in an annular shape to join a component whose external form is cylindrical to another component, an annular welding path 14 is obtained by fixing a workpiece 15 to a main rotational shaft 16, rotating the workpiece 15 (in an arrow symbol L direction), and keeping an attitude of the laser head 12 fixed. Generally, in order to prevent reflected light from a surface of the workpiece 14 from returning directly to and damaging the laser head 12 in the laser welding apparatus 11, a laser irradiation axis is inclined by a fixed angle (head axis inclination angle) D1 with respect to a vertical direction of a surface of the workpiece 15. In a conventional laser welding apparatus, when annular laser welding is performed on part of a very large target object to be machined (workpiece), a size of a mechanism for rotating the workpiece is large and thus a large installation space for the laser welding apparatus is required. On the other hand, when annular laser welding is performed on a fixed workpiece by rotatably moving the welding head, interference between, twisting of, or the like a wiring and cables is an obstacle if it is attempted to rotate a welding head axis to keep the welding head and a feeding direction of the welding filler fixed. Particularly, when an optical fiber transmission type laser is used, a laser transmission optical fiber cable is vulnerable with respect to a physical force and bending. Thus, it is necessary not to apply an excessive force to the laser transmission optical fiber cable.

Referring again to FIG. 1A, in one embodiment, the laser welding apparatus (laser machining apparatus) 1 includes the moving mechanism (hollow structural moving mechanism) 100 having a driving portion such as a motor and a control unit (a controller) 110. The moving mechanism 100 has a first mechanism 2 and a second mechanism 3. The first mechanism 2 guides the head 5 along at least a predetermined two-dimensional plane (for example, an XY plane). The second mechanism 3 has a rotational axis W and guides the rotation of the head 5. When the first mechanism 2 is used, the head 5 can be moved in a curved manner in at least a two-dimensional plane (for example, an XY plane). When the second mechanism 3 is used, the head 5 can rotate 360° or more around a rotational axis W along with the optical cable 41 and the material 62. Examples of a rotatable range include 0° or more and about 360, 390, 420, 450, 480, 510, 540, 570, 600, 630, 660, 690, or 720 or less. The above-described numerical values are typical examples and the rotatable range is not limited to the above-described numerical values. In addition, the first mechanism 2 can be configured to be able to displace a position of the head 5 in a direction which is orthogonal to a two-dimensional plane (for example, a position in a Z direction or a vertical direction) while moving the head 5 in a two-dimensional plane (for example, an XY plane or a horizontal plane). The first mechanism 2 can include a two-dimensional actuator which can move in an X direction and a Y direction (for example, a unit obtained by combining an XY stage and a single-axis actuator). Alternatively, the first mechanism 2 can include a three-dimensional actuator which can move in the X direction, the Y direction, and the Z direction (for example, a unit obtained by combining an XYZ stage and a single-axis actuator). Alternatively, the first mechanism 2 can be configured to include an articulated robot. In an example of a single-axis actuator, the first mechanism 2 can include a carrier unit obtained by integrally combining a ball screw, a linear guide, and a support bearing.

The rotational axis W can be set to be parallel to an axis (for example, the Z axis or a vertical axis) which is orthogonal to a predetermined two-dimensional plane (for example, an XY plane or a horizontal plane). The rotational axis W moves along with the movement of the head 5 using the first mechanism 2. In other words, when the head 5 moves in a curved manner above a two-dimensional plane, the rotational axis W also moves in a curved manner above the two-dimensional plane in accordance with the movement of the head 5. In an example, the rotational axis W is disposed near a rear portion of the head 5 (an end portion on an input side of the laser light 51 or a side to which the optical cable 41 is attached) rather than a front portion thereof (an end portion on an output side of the laser light or the optical outlet 5a). In another example, the rotational axis W is disposed near a center of the head 5. In yet another example, the rotational axis W is disposed near a front portion of the head 5 rather than a rear portion of the head 5. For example, the rotational axis W may be set to cross a front portion, a central portion, or a rear portion of a main body of the head 5. Alternatively, the rotational axis W may be set at a position away from the main body of the head 5 such that it does not substantially cross the main body of the head 5.

In an example, the laser welding apparatus (laser machining apparatus) 1 includes a head axis tilting mechanism 4 and at least one of the head 5 and the nozzle 61 is disposed to be inclined with respect to the rotational axis W. For example, a central axis of the head 5 may be arranged to be inclined with respect to the rotational axis W so that the laser light 51 is incident on a machining position on the workpiece 10 substantially in an inclined manner. The laser light 51 reflected from the workpiece 10 is substantially prevented from being directed toward the head 5 and thus damage to the head 5 due to the reflected light is prevented. For example, a central axis of the nozzle 61 is arranged to be inclined with respect to the rotational axis W so that a material (filler material) is fed to a machining position on the workpiece substantially in an inclined manner. Thus, a material 61 is appropriately set between the workpiece 10 and the head 5. The energy of the laser light 51 is appropriately transmitted to the material 61 and the melted material 61 is appropriately disposed on a welding target portion Q.

The controller 110 includes a storage device that stores a control program or the like which controls the moving mechanism 100 and a processor (processor, processing circuitry, or circuitry) configured to execute the control program. The controller 110 has an attitude control mode for controlling the moving mechanism 100 so that the head 5 rotates around the rotational axis W while the head 5 is moving in a curved manner at least in a two-dimensional plane.

Figure 2:
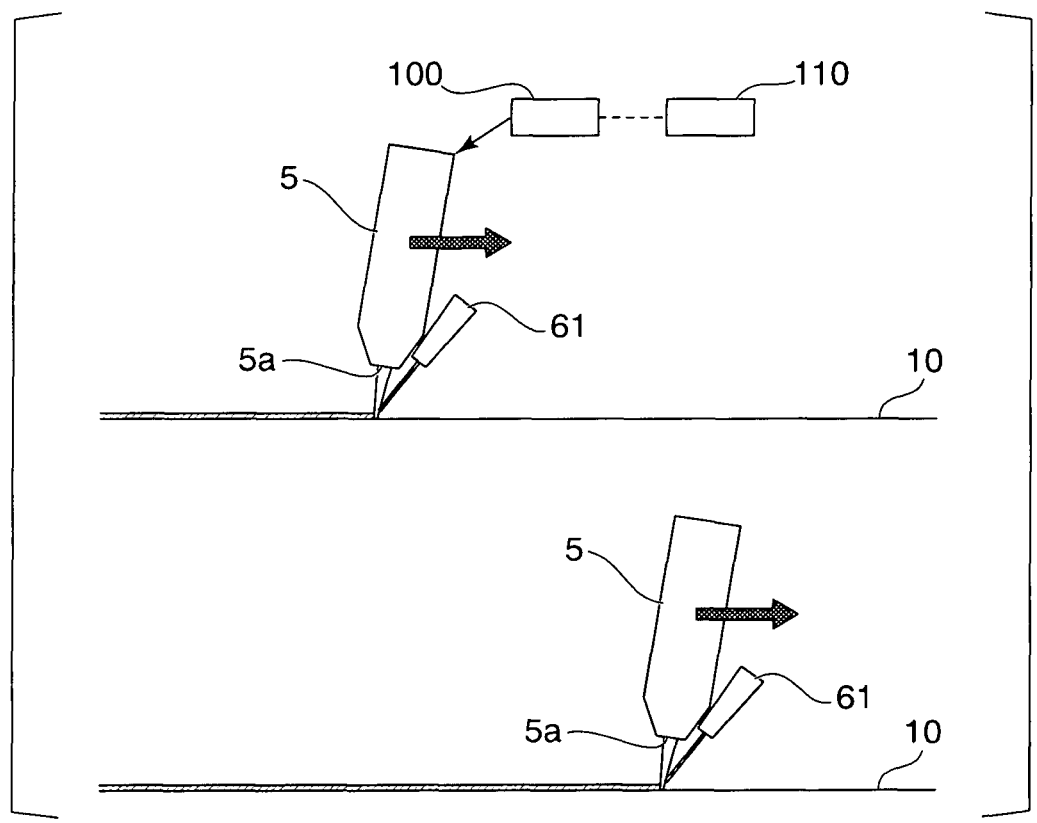
FIG. 2 is a diagram illustrating the movement of a head during laser processing.
Figure 3:
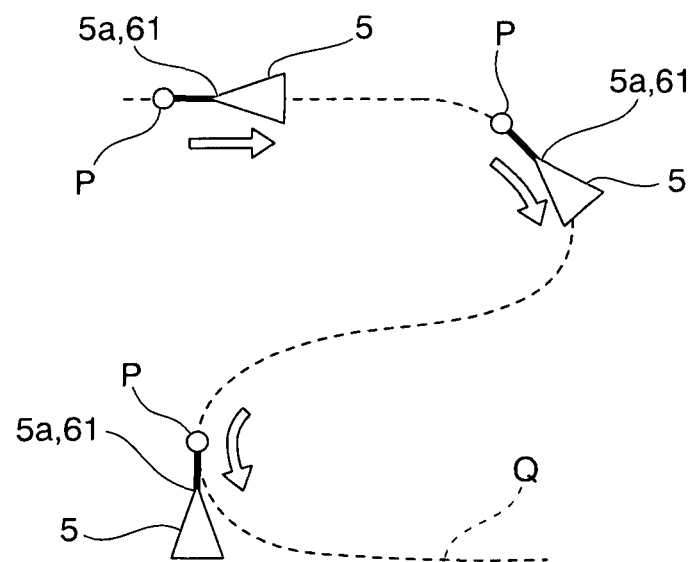
FIG. 3 is a diagram illustrating the movement of the head during laser processing in an attitude control mode.

In an example, as illustrated in FIGS. 2 and 3, in the attitude control mode, the controller 110 controls the moving mechanism 100 so that a location of at least one of the optical outlet 5a of the head 5 and the distal end of the nozzle 61 is upheld in front of a machining position (welding position) P above a target (forward in a moving direction of the head 5) while the head 5 is moving in a curved manner at least in a two-dimensional plane. For example, during a welding processing, both of the optical outlet 5a of the head 5 and the distal end of the nozzle 61 are continuously located in front of the machining position (welding position) P above the target (forward in the moving direction of the head 5).

In an example, as illustrated in FIG. 3, positions of the optical outlet 5a and the distal end of the nozzle 61 are located at forward positions with respect to the machining position P on an extension line of a straight line portion in a welding target portion (target line) Q in the straight line portion (forward positions in the moving direction of the head 5). Alternatively, the positions may be at forward positions with respect to the machining position P in a tangential direction of a curved line in a curved portion of the target line Q. Laser light is radiated from the front of the machining position P toward the machining position P in the tangential direction in the curved portion of the target line Q and a material (filler material) is supplied in the tangential direction. When a constant attitude of the head 5 is maintained with respect to the machining position P, high quality and uniform welding is performed on the entire welding target portion Q. In another example, the head 5 can be set to an attitude different from the above-described attitude with respect to the machining position P. An attitude of the head 5 is set in accordance with machining conditions such as a shape of a target and thus an irradiation direction of the laser light 51 and a supply direction of the material (filler material) are appropriately controlled.

Figure 4:
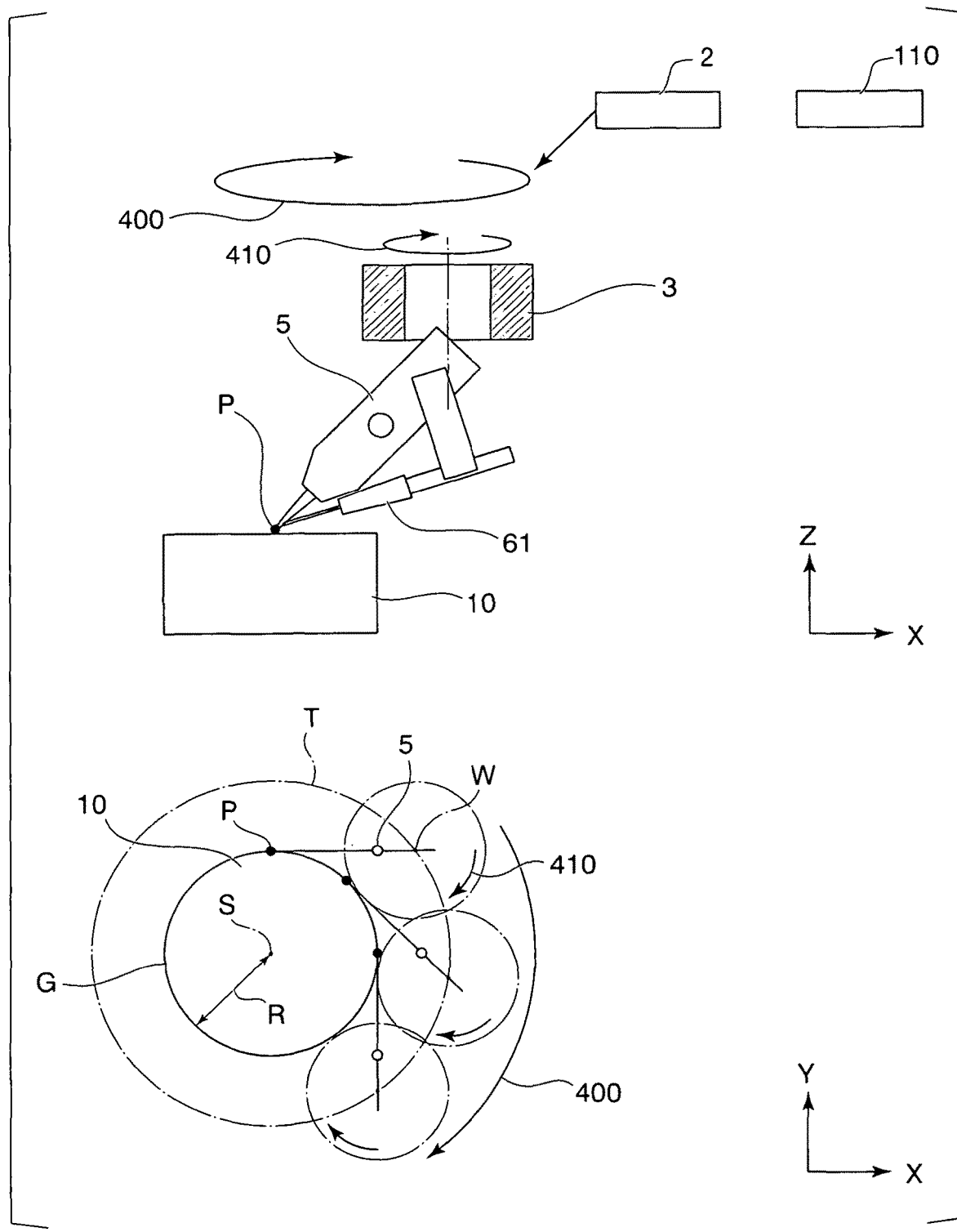
FIG. 4 is a diagram illustrating the movement of the head during laser processing in the attitude control mode.

In an example of the attitude control mode illustrated in FIG. 4, the welding target portion (target line) Q has an annular shape in which it surrounds a center position S. In other words, it is necessary to perform welding over the entire circumference of a circular ring. When the first mechanism 2 is used, the head 5 moves along a circular route (path) surrounding a center position S in the XY plane (circling motion 400). At that time, the rotational axis W of the head 5 also moves on a circular path "T". When the second mechanism 3 is used, the head 5 can rotate 360° or more around the rotational axis W at any position on the circular path (rotational motion 410). In other words, the head 5 can rotate 360° or more around the rotational axis W irrespective of the position of the rotational axis W on the circular path T. Thus, an attitude (e.g., an orientation) of the head 5 with respect to the target position (i.e., machining position) P can be controlled. In other words, an irradiation direction of laser light and a supply direction of a material (filler material) with respect to a target are managed. Even in the case of a large workpiece 10, an appropriate attitude of the head 5 is maintained with respect to the machining position P of the workpiece (i.e., target) 10 along the entire circular path without moving the workpiece 10. As a result, high quality and uniform welding is performed on the entire welding target portion Q. It should be noted that a target line is not limited to an annular shape and can be, for example, a quadrangular shape or a wave shape. It is possible to perform laser welding on components having any joining surfaces.

Referring again to FIG. 1A, in one embodiment, the second mechanism 3 is supported by the first mechanism 2 and includes a cavity unit (hollow unit) 30 connected to the head 5. In the embodiment, the cavity unit 30 includes a rotating body (hollow shaft) 31, a supporting body 32, and a motor 33. The supporting body 32 is supported by the first mechanism 2. The rotating body 31 is rotatably supported by the supporting body 32. The head 5 is fixed to the rotating body 31. A driving force of the motor 33 is transmitted to the rotating body 31. The head 5 rotates along with the rotation of the rotating body 31. A rotational axis of the rotating body 31 coincides with the rotational axis W of the head 5. The rotation of the head 5 around the rotational axis W is guided via the cavity unit 30. The cavity unit 30 can be configured such that a driving force of the motor 33 is transmitted to the rotating body 31 via a transmission member such as a gear or a belt. Alternatively, the cavity unit 30 can include a hollow motor in which the rotating body 31, the supporting body 32, and the motor 33 are integrally combined. In another example, the cavity unit 30 can have a different constitution from the above-described constitution.

Figure 5:
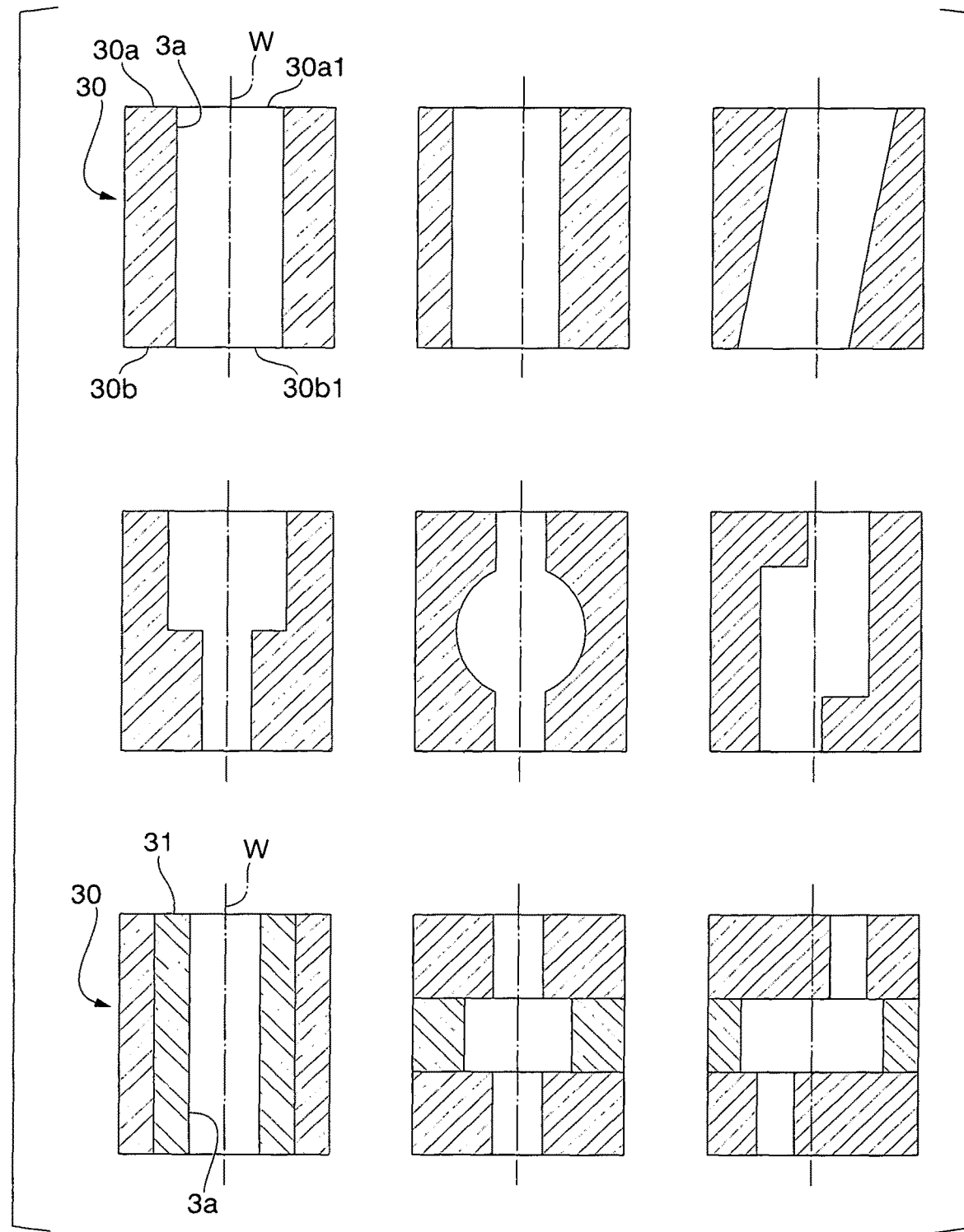
FIG. 5 is a schematic diagram illustrating a plurality of examples of a cavity unit.

The cavity unit 30 can have a cavity (insertion portion) 3a provided at least along the rotational axis W. As illustrated in a plurality of examples in FIG. 5, the cavity unit 30 is provided on a first surface 30a which is a surface on a first side in a direction along the rotational axis W (first end surface) and can have an opening 30a1 connected to the cavity 3a. The cavity unit 30 is provided on a second surface 30b which is a surface on a second side in the direction along the rotational axis W (second end surface) and can have an opening 30b1 connected to the cavity 3a. In an embodiment, the cavity unit 30 includes a tubular rotating body 31 and can be configured such that a through hole as the cavity 3a is provided in the rotating body 31. In another example, the cavity unit 30 can be configured such that the cavity 3a is provided in a member having a shape other than a tubular shape. Alternatively and/or additionally, the cavity unit 30 can be configured to be divided into a plurality of members in an axial direction. In the cavity unit 30, the plurality of separate members can be configured to be able to move relative to each other.

As illustrated in FIG. 1A, parts of the optical cable 41 attached to the head 5 and the material (filler material) 62 are arranged in the cavity 3a. When the optical cable 41 and the material 62 are arranged at least along the rotational axis W, the movement of the optical cable 41 and the material 62 during the rotational motion of the head 5 is minimized. As a result, a load on the optical cable 41 and the material 62 during an operation of the head 5 is reduced and damage or the like with respect to the optical cable 41 and the material 62 is prevented. Furthermore, the cavity 3a is advantageous in downsizing the entire apparatus. In addition, a laser welding apparatus 1 can be configured such that part of the main body of the head 5 is arranged in the cavity 3a of the second mechanism 3 in addition to the optical cable 41 and the material 62.

Here, examples of target objects to be machined to be applied to the laser machining apparatus (laser welding apparatus) 1 include a workpiece for manufacturing bearings such as a large roller bearing, an extra-large size roller bearing (an ultra-large roller bearing), or a bearing for a rolling mill roll neck. Bearings manufactured using the laser machining apparatus 1 can be provided in machines and vehicles. These machines can include machines (machinery) which use human power for power and machines which use power other than human power for power. Examples of machines include work machines, power generators, rolling mills, and the like. Furthermore, examples of vehicles include automobiles, railroad vehicles, large vehicles, construction machine vehicles, and the like. Examples of target objects to be machined include a shaft for a wind power generator, a workpiece for manufacturing a member configured to support a gear, and the like. Alternatively, components other than those described above can be target objects to be machined. For example, the laser welding apparatus 1 can be used not only for roller bearing cage pin welding but also for the general vehicle component (automobile component) welding.

Figure 6:
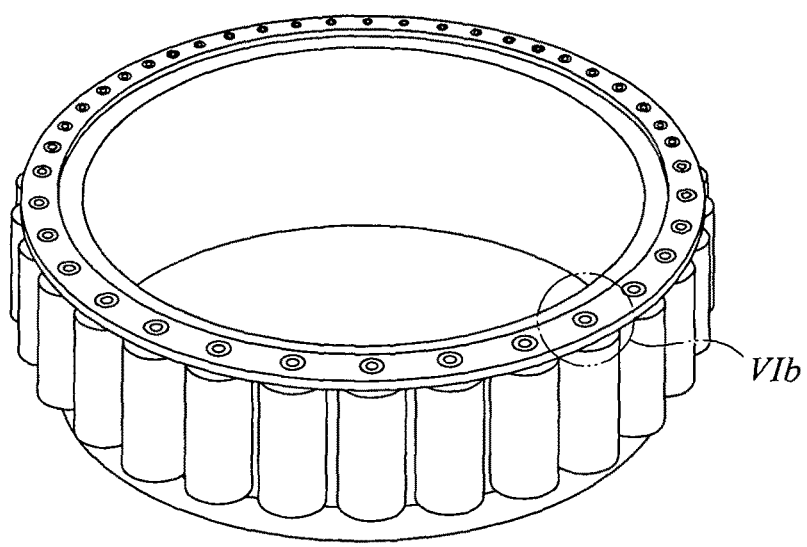
FIG. 6 is a schematic diagram illustrating an extra-large size roller bearing as an example of a target to be machined.
Figure 6:
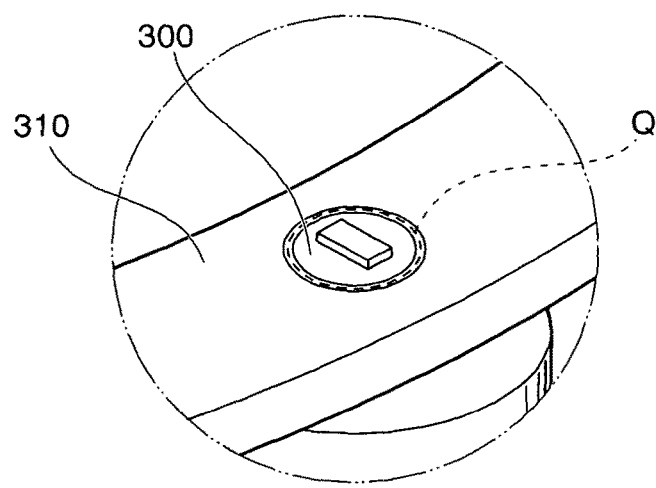

In an embodiment illustrated in FIG. 6, an extra-large size roller bearing (cylindrical roller bearing) is a workpiece to be machined. The extra-large size roller bearing has a "roller" disposed between an inner ring and an outer ring. An end portion of a pin 300 inserted into the roller is joined to a plate member (cage ring) 310. For this joining, a welding processing is performed on the target portion (circular target line) Q over the entire circumference of the end portion of the pin 300. In another example, as a bearing, bearings of other types such as tapered roller bearings and bearings other than roller bearings can be adopted.

Figure 7A:
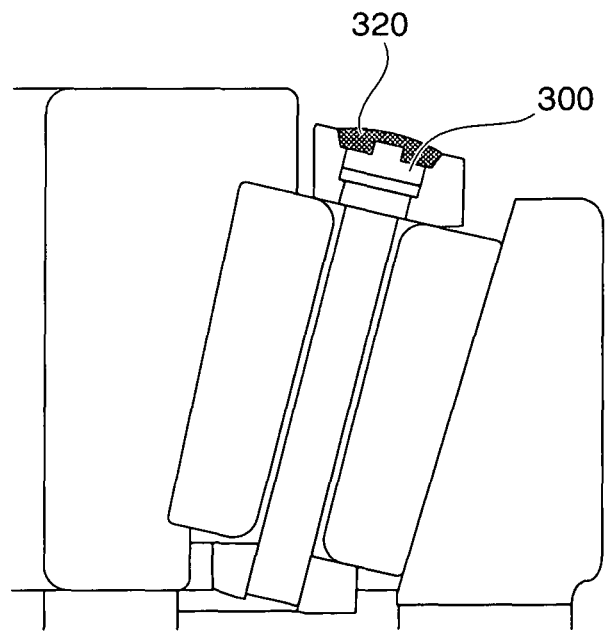
FIG. 7A is a schematic diagram illustrating a welded portion in metal active gas (MAG) welding.
Figure 7B:
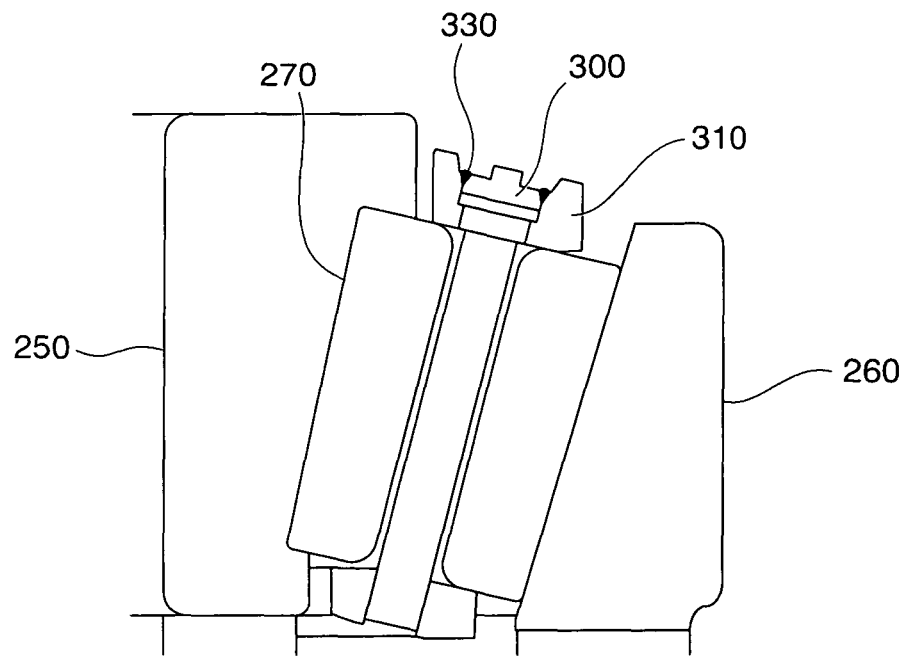
FIG. 7B is a schematic diagram illustrating a welded portion in laser welding.

In an embodiment of a tapered roller bearing, as illustrated in FIG. 7A, when metal active gas (MAG) welding is used, a filler is supplied over the entire end portion of the pin 300 (welded portion 320). In this case, a sputter diameter is relatively large and a thermal effect is relatively wide. As illustrated in FIG. 7B, when laser welding is used, it is easy to set a welding target portion to a necessary minimum, and for example, only the surrounding of the end portion of the pin 300 can be subjected to welding (welded portion 330). In other words, in an embodiment of a tapered roller bearing, the bearing illustrated in FIG. 7B has an inner ring 250, an outer ring 260, a roller 270, the pin 300, and the cage ring (lateral plate) 310 and the welded portion 330 is provided only around the end portion of the pin 300. In this case, the sputter diameter is very small and an amount is also relatively small. Thus, a thermal effect is relatively narrow. As a result, high quality and uniform welding is performed over the entire target and a high quality product can be expected. Also in another example, high quality and uniform welding is performed over the entire target on a bearing or a workpiece other than a bearing and a high quality product can be expected.

An example associated with welding of a roller bearing will be described below. As illustrated in FIG. 1A, in this example, a laser machining apparatus is a laser welding apparatus 1 configured to perform laser welding on a workpiece 10. The laser welding apparatus 1 includes a hollow structural moving mechanism 100 configured to move a laser welding head 5 configured to irradiate the workpiece 10 with laser light, a welding filler feeding mechanism 6 configured to supply a welding material 62 to a position on which laser welding is performed, and a welding unit 50 including the laser welding head 5 and the welding filler feeding mechanism 6 and including an insertion portion 3a through which wire materials 41 and 62 of the laser welding head 5 and the welding filler feeding mechanism 6 can be inserted. The hollow structural moving mechanism 100 includes a hollow shaft 31 joined to the welding unit 50 and a motor 33 configured to rotate the hollow shaft 31. In an embodiment, the hollow structural moving mechanism 100 can include a hollow motor capable of rotating the welding unit 50. The nozzle 61 is disposed to be inclined with respect to the rotational axis W. The laser welding apparatus 1 includes a head axis tilting mechanism (tilting mechanism) 4 having the laser welding head 5 and the welding filler feeding mechanism 6 attached thereto such that it is inclined downward in a vertical direction for the purpose of performing laser welding on an object to be machined (workpiece or target), a hollow unit 30 having a rotational axis W configured to rotate the head axis tilting mechanism 4, and an XYZ stage (three-dimensional actuator) 2 configured to rotate the rotating head axis tilting mechanism 4 along a plane position of the workpiece 10 on which laser welding is performed. Alternatively, a unit in which a two-dimensional actuator, a three-dimensional actuator and/or a uniaxial actuator are combined can be used instead of the XYZ stage. Drive control for the XYZ stage 2, the hollow unit 30, the laser welding head 5, and the welding filler feeding mechanism 6 is performed by the controller 110.

Figure 1B:
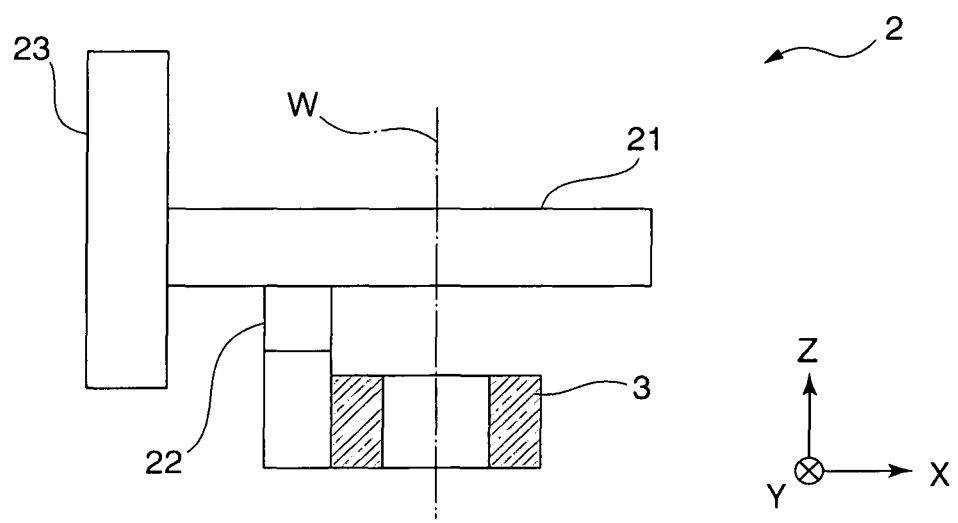
FIG. 1B is a schematic explanatory view of an XYZ stage in the laser welding apparatus.

As illustrated in FIG. 1B, the XYZ stage 2 can move three-dimensionally in XYZ directions and an X-direction linear motion mechanism 21 is attached to move in a plane in the XYZ stage 2 in a horizontal direction which is perpendicular to a vertical direction. A Y-direction linear motion mechanism 22 is attached to move in a plane in the XYZ stage 2 in a horizontal direction which is perpendicular to a vertical direction in a direction different from an X direction.

The X-direction linear motion mechanism 21 and the Y-direction linear motion mechanism 22 synchronously rotate with the rotational axis W while being driven in two directions, that is, an X direction and a Y direction in a plane, such that a center of the rotational axis W draws a circle (refer to reference symbols 400 and 410 in FIG. 4) and the laser welding head 5 is configured to always face a predetermined direction with respect to a welded place of the work item 10. A Z-direction linear motion mechanism 23 is attached to move in the XYZ stage 2 in the vertical direction. The Z-direction linear motion mechanism 23 is driven so that the focal point of the laser light 51 is aligned with a welded place of the workpiece 10 before welding is started to adjust a laser irradiation position from the laser welding head 5.

The head axis tilting mechanism 4 is a common integral supporting body including the laser welding head 5 and the welding filler feeding mechanism 6 configured to supply the welding material 62 and can be moved in an arbitrary direction using a servomotor 33 configured to rotatably drive the hollow unit 30. Furthermore, in order to prevent reflected light from a surface of the workpiece from returning directly to the laser welding head 5, the laser welding head 5 is attached such that a laser irradiation axis has a fixed angle (head axis inclination angle) D2 with respect to an axial direction of the rotational axis W.

The hollow unit 30 (the hollow shaft 31) has a hollow and circular (annular) outer circumferential surface when viewed from the axial direction of the rotational axis W and the plate-like head axis tilting mechanism 4 included in the XYZ stage 2 and protruding from the lower side of the outer circumferential surface is attached above the outer circumferential surface thereof. The hollow unit 30 includes a gear having a structure in which it turns along a circular outer circumferential (ring) surface in synchronization with the rotation of the head axis tilting mechanism 4 about the rotational axis W when the servomotor 33 is driven.

In this way, since the workpiece 10 is not rotated, the apparatus can be miniaturized. Furthermore, when the hollow unit 30 in which an axis center portion serving as the rotational axis W is the hollow insertion portion 3a is used, it is possible to pass a welding filler wire 62, a laser transmission optical fiber cable 41, or the like through the insertion portion 3a. Thus, a burden is not exerted on a wire material such as the welding filler wire 62 and the laser transmission optical fiber cable 41 even when the laser welding head 5 rotates 360° as in circular welding. Therefore, it is possible to prevent a wiring such as the laser transmission optical fiber cable 41 from being twisted and damaged. Furthermore, when disposing the laser welding head 5 at a distance from the workpiece 10, it is possible to insert a part of the head 5 into the insertion portion 3a serving as a hollow portion in the hollow unit 30 (refer to FIG. 4).

The laser welding head 5 has a rod shape in which it protrudes downward in the axial direction of the rotational axis W and is attached to be able to change an angle thereof with respect to the rotational axis W using the head axis tilting mechanism 4. A laser beam is transmitted to the laser welding head 5 via the laser transmission optical fiber cable 41 from a laser oscillation apparatus (not shown). Furthermore, a plurality of lenses as an optical system configured to converge the laser light 51 up to an intensity necessary for laser welding are disposed in the laser welding head 5. Thus, the laser welding head 5 radiates energy (laser light) in a state in which the converged laser light 51 is condensed on the workpiece 10 as a heat source. A beam spot of the laser light 51 is radiated with a very small diameter (for example, a diameter of about several hundred μm or less) with high positional accuracy. It is possible to prevent the laser transmission optical fiber cable 41 from being twisted and damaged when a rotational coupling is provided to a coupling portion between the laser transmission optical fiber cable 41 and the laser welding head 5.

The welding filler feeding mechanism 6 has a downward and inclined attitude together with the head axis tilting mechanism 4 and the laser welding head 5 and is movably attached using the attachment plate 63. In the embodiment, the planar movement in the X axis direction and the Y axis direction is synchronized with the rotation of the W axis so that the head axis inclination angle D2 and a feed attitude of the welding filler feeding mechanism 6 are maintained in a predetermined attitude during welding and driving is performed so that an irradiation direction of the laser light 51 and a feeding direction of the welding filler feeding mechanism 6 are upheld in a predetermined manner with respect to a traveling direction of the laser welding head 5 (refer to FIG. 4). Furthermore, the welding filler is fed in accordance with a welding speed.

As a welding material fed by the welding filler feeding mechanism 6, the welding filler wire 62 which is generally fed in feeding a wire is used. The welding filler nozzle 61 configured to set a position to which the welding filler wire 62 is fed is provided in the welding filler feeding mechanism 6.

The laser welding method according to the embodiment performs laser welding on the workpiece 10 in an annular shape through operations of the head axis tilting mechanism 4 having the laser welding head 5 and the welding filler feeding mechanism 6 attached thereto to be inclined downwardly in the vertical direction, the hollow unit 30 having the rotational axis W configured to rotate the head axis tilting mechanism 4, and the XYZ stage 2 configured to rotate the rotating head axis tilting mechanism 4 along the plane position of the workpiece 10 on which the laser welding is performed. Drive control for the XYZ stage 2, the hollow unit 30, the laser welding head 5, and the welding filler feeding mechanism 6 is performed by the controller 110.

The above-described laser welding method using the laser welding apparatus 1 will be described below with reference to the schematic diagram in FIG. 4.

Before Welding (1) The workpiece 10 is fixed to a placing table. In the embodiment, the workpiece 10 to be welded is a metallic member and a plurality of annular welded places Q serving as portions on which welding is performed are present on an upper end surface of the workpiece 10 in the axial direction (refer FIGS. 6 and 7B). Examples of such a member include a cage or the like used for a roller bearing. A roller bearing cage of a welding pin type is constituted of a pin configured to pass through a hollow roller and upper and lower cage rings configured to hold the pin, one of the cage rings and a pin end portion are fixed using a screw or the like and the other cage ring is joined through welding.

(2) The laser welding apparatus 1 having the laser welding head 5 and the welding filler feeding mechanism 6 mounted therein is set in the XYZ stage 2 having the X-Y-(plane)-direction linear motion (movement) mechanisms 21 and 22 and the rotational axis W. At that time, in order to prevent the occurrence of interference or twisting, the laser transmission optical fiber cable 41, the welding filler wire 62, and the like are caused to pass through the insertion portion 3a serving as the hollow portion in the hollow unit 30.

(3) In order to perform setting so that the laser welding head faces a predetermined direction with respect to the machining position (welding position) P of the workpiece 10 by adjusting the X-direction linear motion mechanism 21 and the Y-direction linear motion mechanism 22 and to prevent reflected light from the surface of the workpiece from returning directly to the laser welding head 5, the laser welding head 5 is attached so that the laser irradiation axis has the fixed angle (head axis inclination angle) D2 with respect to the axial direction of the rotational axis W. Examples of the head axis inclination angle D2 include about 1, 2, 3, 4, 5, 10, 15, 20, 25, 30, 35, 40, 45, 50, 60, 70, or 80°. The above-described value is an example of a typical numerical value and an inclination angle is not limited to the above-described values.

(4) A position of the laser welding head 5 is adjusted in advance so that the focal point of the laser light 51 is aligned with a welding target portion of the workpiece 10 by driving the Z-direction linear motion mechanism 23. In addition, the welding filler feeding mechanism 6 and a distal end position and a direction of the filler nozzle 61 are adjusted so that the welding filler wire 62 is appropriately fed to the machining position P.

During Welding (1) When the welding operation is started, as illustrated in FIG. 4, the controller 110 causes the X-Y-direction linear motion mechanisms 21 and 22 and the hollow shaft 3 in the XYZ stage 2 to operate so that the machining position P traces a preset welding shape (a circle Q which is a circle having a radius R in an upper end surface of the workpiece 10 in the embodiment) while a direction of the laser welding head 5 is upheld in a predetermined matter with respect to the machining position P.

(2) To be specific, the X-direction linear motion mechanism 21 and the Y-direction linear motion mechanism 22 are synchronously driven so that the center of the rotational axis W draws a circle in an X-Y planar shape and the rotational axis W is caused to be synchronously rotated. In other words, the movement trajectory of the W axis using the XYZ stage 2 (a circle of a broken line in FIG. 4) and the rotation of the laser welding head 5 indicated by a circle of a solid line moving on the broken line in FIG. 4 are synchronized. Thus, the machining position P moves on the circle Q while the direction of the laser welding head 5 is kept fixed in a predetermined manner with respect to the machining position P.

(3) Since the head axis inclination angle D2 and the attitude of the welding filler feeding mechanism 6 are always kept in a predetermined attitude during welding, the reflected light of the laser light 51 does not reach the laser welding head 5. Furthermore, it is possible to perform laser welding with a rotation angle of 360° or more with respect to the workpiece 10 because the welding filler wire 62 is continuously fed to the machining position P appropriately.

EXPLANATION OF NUMERALS AND CHARACTERS

1 Laser welding apparatus (laser machining apparatus)
2 XYZ stage (XY stage)
4 Head axis tilting mechanism
5 Laser welding head
6 Welding filler feeding mechanism
10 Work item (workpiece)
100 Hollow structural moving mechanism

The invention claimed is:

1. A laser machining method comprising:
providing a laser machining apparatus that includes:
   a head having an optical outlet from which laser light is output;
   an optical cable attached to the head;
   a nozzle attached to the head to direct a material supplied to a target; and
   a moving mechanism having a driving portion, a first mechanism and a second mechanism, the first mechanism being configured to allow the head to move in a curved manner in at least a two-dimensional plane, the second mechanism having a rotational axis and a cavity unit that has a body having a cavity provided along at least the rotational axis, wherein a tilting mechanism is arranged between the cavity unit and the head, the tilting mechanism is attached to the cavity unit and is configured to change an angle of the head with respect to the rotational axis; and
controlling the moving mechanism of the laser machining apparatus by:
   moving the head in a curved manner in at least a two-dimensional plane; and
   rotating, all together, the head, the nozzle and the tilting mechanism 360° or more around the rotational axis in a state in which the optical cable and the material are inserted through the cavity of the cavity unit.

2. The laser machining method according to claim 1, wherein the moving mechanism is controlled so that a location of at least one of the optical outlet of the head and a distal end of the nozzle is upheld in front of a machining position while the head moves in the curved manner in at least the two-dimensional plane.

3. The laser machining method according to claim 1, wherein the moving mechanism is controlled so that an irradiation direction of the laser light is in a tangential direction of a curved line of a curved machining target.

4. A method for manufacturing a bearing, the method comprising:
   arranging a roller between an inner ring and an outer ring; and
   joining a plate member and an end portion of a pin, which is inserted into the roller, by using the laser machining method according to claim 1.

5. A laser machining method comprising:
   providing a laser machining apparatus that includes:
      a head having an optical outlet from which laser light is output;
      an optical cable attached to the head;
      a nozzle attached to the head to direct a material supplied to a target; and
      a moving mechanism having a driving portion, a first guiding mechanism and a second guiding mechanism, the first guiding mechanism being configured to allow the head to move in a curved manner in at least a two-dimensional plane, the second guiding mechanism having a rotational axis and a cavity unit that has a body having a cavity provided along at least the rotational axis, wherein a tilting mechanism is arranged between the cavity unit and the head, the tilting mechanism is attached to the cavity unit and is configured to change an angle of the head with respect to the rotational axis; and
   controlling the moving mechanism of the laser machining apparatus by:
      moving the head in a curved manner in at least a two-dimensional plane; and
      rotating, all together, the head, the nozzle and the tilting mechanism 360° or more around the rotational axis in a state in which the optical cable and the material are inserted through the cavity of the cavity unit.

6. The laser machining method according to claim 5, wherein the moving mechanism is controlled so that a location of at least one of the optical outlet of the head and a distal end of the nozzle is upheld in front of a machining position while the head moves in the curved manner in at least the two-dimensional plane.

7. The laser machining method according to claim 5, wherein the moving mechanism is controlled so that an irradiation direction of the laser light is in a tangential direction of a curved line of a curved machining target.

8. A method for manufacturing a bearing, the method comprising:
   arranging a roller between an inner ring and an outer ring; and
   joining a plate member and an end portion of a pin, which is inserted into the roller, by using the laser machining method according to claim 5.

* * * * *